Figure 1:
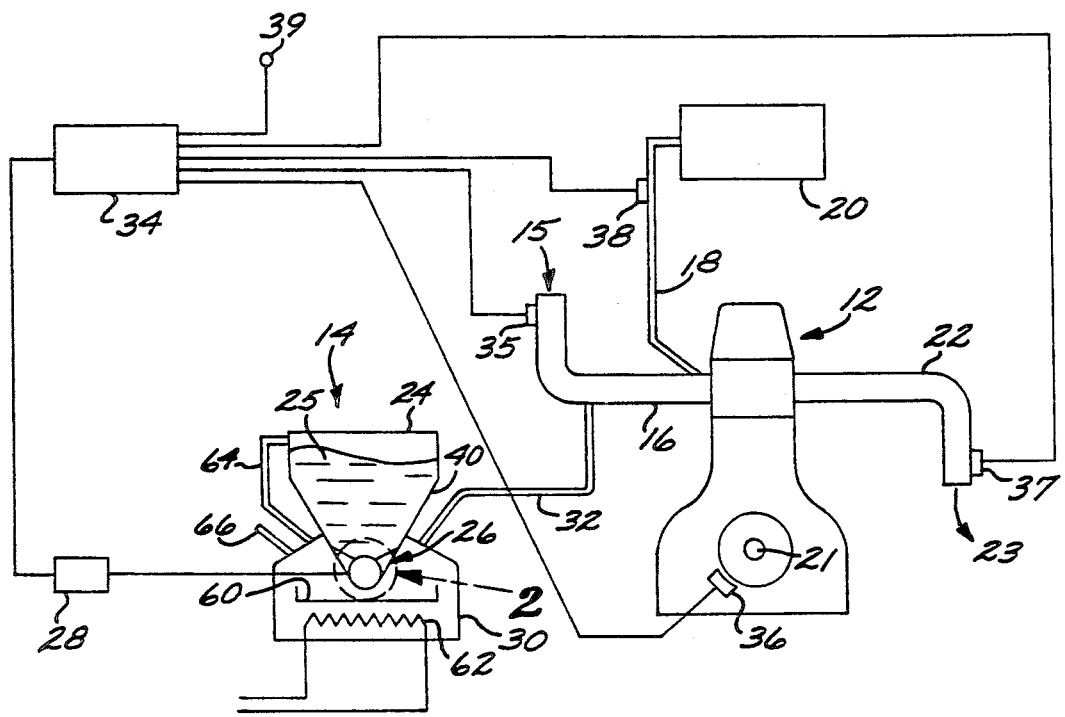
Figure 2:
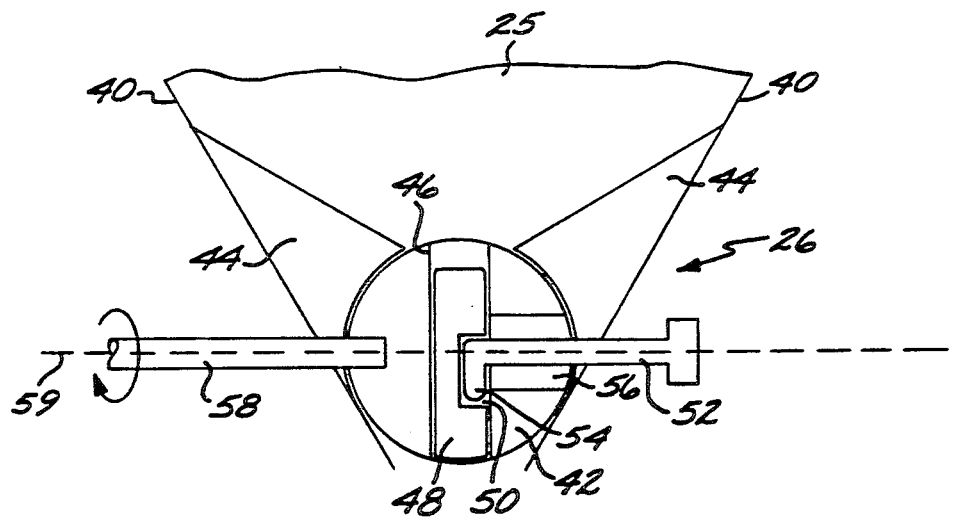

United States Patent [19]
Kraus et al.

[11] Patent Number: 5,113,804
[45] Date of Patent: May 19, 1992

[54] COMBUSTION ENHANCEMENT SYSTEM

[75] Inventors: Greg A. Kraus, Long Beach; William R. Simmons, Rancho Palos Verdes; Mark R. J. Wells, Bakersfield, all of Calif.

[73] Assignee: Advanced Combustion Technology, Inc., Gardena, Calif.

[21] Appl. No.: 650,766

[22] Filed: Feb. 4, 1991

[51] Int. Cl.$^5$ .................. F02B 43/04; F02B 47/04
[52] U.S. Cl. ........................... 123/1 A; 431/4
[58] Field of Search ............ 123/1 A, 23, 198 A; 431/4

[56] References Cited

U.S. PATENT DOCUMENTS

| | | | |
|---|---|---|---|
| 2,439,748 | 4/1948 | Nettel | 123/23 |
| 3,450,116 | 6/1969 | Knight et al. | 123/531 |
| 3,862,819 | 1/1975 | Wentworth, Jr. | 431/4 |
| 3,945,366 | 3/1976 | Matthews | 123/198 A |
| 4,014,637 | 3/1977 | Schena | 431/4 |
| 4,016,837 | 4/1977 | Wentworth, Jr. | 123/25 R |
| 4,090,838 | 5/1978 | Schena et al. | 431/4 |
| 4,223,642 | 9/1980 | Okubo | 123/1 A |
| 4,362,130 | 12/1982 | Robinson | 123/1 A |
| 4,410,467 | 10/1983 | Wentworth, Jr. | 261/55 |
| 4,419,967 | 12/1983 | Protacio et al. | 123/1 A |
| 4,475,483 | 10/1984 | Robinson | 123/1 A |
| 4,715,347 | 12/1987 | Hampton, et al. | 123/551 |
| 4,800,068 | 1/1989 | Perry | 422/173 |

*Primary Examiner*—Tony M. Argenbright
*Attorney, Agent, or Firm*—Fulwider, Patton, Lee & Utecht

[57] ABSTRACT

An apparatus and method for enhancing the efficiency of a combustion process and thereby reducing undesirable emissions in which a solid combustion enhancing substance is converted into a highly dispersed, gas-transportable state at a controlled rate and is subsequently conveyed into the zone of combustion. The use of a substance in its solid state eases handling and avails highly effective materials for combustion and enhancement while the necessary conversion of the substance from one state to another enables a high degree of control as to its rate of addition to the combustion process. The substance's highly dispersed state when it enters the combustion process maximizes its effect.

30 Claims, 1 Drawing Sheet

COMBUSTION ENHANCEMENT SYSTEM

BACKGROUND OF THE INVENTION

1. Field of the Invention

The present invention relates generally to a method and apparatus for increasing the efficiency of hydrocarbon combustion processes to thereby reduce the production of undesirable emissions. More particularly, the invention provides an apparatus and method for conveying, at a precisely controllable rate, minute quantities of a combustion enhancing substance directly to the site of combustion.

2. Description of the Prior Art

A wide variety of methods and devices have been disclosed that are intended to enhance the combustion of hydrocarbon fuels by introducing various substances into the combustion process. The intent is to improve efficiency, i.e. to increase the amount of the fuel's inherent chemical energy that is converted into thermal energy, and simultaneously to decrease undesirable emissions including unburned or incompletely burned hydrocarbons, carbon monoxide, and nitrogen oxides. Bringing about a more complete oxidation of the hydrocarbons and carbon monoxide has the simultaneous effect of increasing efficiency and decreasing the undesirable emissions.

A wide variety of substances have been relied upon to perform a variety of functions in the interests of enhancing combustion processes. Coreactants, catalysts, and as well as compounds subject to operating mechanisms not fully understood have been introduced into combustion processes via the fuel supply, the oxidant supply or into the fuel and oxidant comixture just prior to or during actual combustion.

The viability of a particular system depends not only on the efficacy of the substance utilized, but also on how easily the substance can be handled as well as how easily the substance can accurately be delivered into the combustion process in a highly dispersed form at the proper levels. Substances have been identified that are effective at ppb-range concentrations but systems attempting to deliver such small concentrations in highly dispersed form have suffered from complexity and fail to maintain proper concentration levels. Maintaining the proper concentration level is important not only in terms of the economic considerations involved, but also because the presence in the combustion process of too little as well as too much active substance may diminish its enhancing effect.

Platinum is an example of a substance known to promote combustion reactions at concentrations as low as 80 ppb of fuel. The extremely low concentration requirement precludes simply finely dividing the metal for gradual introduction into a combustion process not only in terms of actually being able to achieve 80 ppb, but also in terms of sufficiently dispersing such a small quantity of solid material amongst a typically highly dispersed fuel/oxidant combustible mixture. Platinum has extremely high melting and boiling points and therefore a commensurately low vapor pressure which hinders attempts to introduce the substance into a combustion process as a vapor. As a result of platinum's physical properties, direct addition of metallic platinum has not provided a viable approach to combustion enhancement. Various compounds of platinum have therefore been considered as vehicles for introducing a highly dispersed form of platinum into a combustion process, lots of attention having been focused on solutions of such compounds. While systems have been proposed that do thereby succeed in delivering the desired concentrations of highly dispersed platinum into a combustion process, practical problems prevail that make such systems complex and nonetheless unable to maintain a steady delivery rate. Moreover, the disclosed systems appear incapable of quickly and easily adjusting for changing feed rate requirements. A typical example of a prior art system is that provided by B. J. Robinson, in U.S. Pat. No. 4,295,816 wherein a system is described that introduces minute quantities of platinum into a diesel or gasoline engine's combustion chamber. A small quantity of combustion air is bubbled through a platinum compound containing aqueous solution at a constant rate to generate a catalyst containing mist which is then gradually drawn into the combustion chamber. This bursting bubble technique reportedly serves to draw out the catalytically active solute without significantly depleting the solvent, although some of the solvent is subject to evaporation. It would appear to be extremely difficult to maintain a constant platinum compound concentration within the aqueous solution which would have a commensurate effect on the amount of platinum transferred to the mist generated by the bubbling action. It is further conceivable that factors such as air temperature, solution temperature, and atmospheric pressure and humidity could effect the transfer rate of the platinum compound from solution to the mist. Less than the optimal catalyst concentration level would diminish the desired combustion enhancing effect, while greater than optimal concentrations would be wasteful and additionally, may in fact have a deleterious effect on the performance of the system as well. The inaccuracy of the delivery system as well as the problems attendant with the handling of solutions which require periodic concentration adjustment provides a typical example of the disadvantages associated with prior art systems. Similar systems have been proposed for a wide variety substances thought to have a combustion enhancing effect including rhenium compounds.

Additional considerations are of critical importance in automotive applications wherein the combustion enhancing substance must not only be consumed at an economical rate, but the bulk and weight of the substance must be such so as to provide reasonably long replenishment intervals. Further, the combustion enhancing substance handling and delivery system should be adaptable to existing engine and vehicular designs. In the case of aftermarket applications, the system must further be readily adaptable to particular vehicles already in service.

The prior art has failed to provide a hydrocarbon combustion enhancing system capable of delivering minute quantities of an easily handleable and effective combustion enhancing substance at a precisely controllable rate for extended periods of time in an economical fashion. Moreover, systems have not been disclosed that provide for extended service cycles and which are readily adaptable to existing combustion processes.

SUMMARY OF THE INVENTION

The present invention overcomes the above noted shortcomings of the prior art to provide a method and apparatus for introducing minute quantities of a highly dispersed combustion enhancing substance into a combustion process. The method relies on the selection of a combustion enhancing substance that exists as an air stable solid under ambient conditions and is therefore easily handled and stored. Further, the substance is selected for its convertiblility directly from its solid state into a highly dispersed, gas-transportable state, preferably simply by heating to within an easily attainable and easily maintainable temperature range. By obviating the need to form a solution, the present invention overcome the difficulties associated with transferring a solute to a highly dispersed, gas-transportable state and additionally overcomes the difficulties associated with the handling of liquids and fluctuating solute concentrations.

The method of the present invention calls for the solid substance to be directly converted to its highly dispersed, gas-transportable state as by sublimation. Once the substance is in its gaseous form, it is transported to the combustion zone preferably by a flow of gas either contemporaneously formed with the conversion of the substance or by a flow of combustion air being inducted into the combustion process. By controlling the amount of substance allowed to convert into its gas-transportable form, the concentration of the substance participating in the combustion process is effectively controlled. The invention additionally calls for sensor feedback mechanisms to control the conversion rate of the substance from its solid to its gas transportable state as a function of either fuel consumption rate or emission rate or as a function of indirect indications of such parameters.

The compound bis-acetylacetonato platinum has been found to be especially well adapted for the practice of the present invention. The substance, in its finely divided powdered form, is metered onto a heated surface where it sublimes to be carried off into the combustion process. More particularly, the powder is transferred from a hopper onto a surface, maintained at about the substance's sublimation temperature and well below its decomposition temperature, via a positive displacement pump driven by a variable speed motor. The motor speed is controlled as a function of fuel consumption rate or the emission rate from the combustion process of certain compounds. By controlling the temperatures the substance is subjected to, it remains highly dispersed and gas-transportable and can be swept into the combustion zone by combustion air.

The present invention additionally provides for the comixture of a dry powdered filler material with the substance to act as a diluent and optionally to create propulsive gas for transporting the active substance into the combustion zone. By selecting a filler material of comparable particle size and density, separation of the intermixed powders during handling is substantially precluded. By further selecting the material to have a sublimation temperature comparable to the temperature at which the active substance is converted to its gas-transportable state, a contemporaneous creation of gas pressure and flow is created. Bis-acetylacetonato platinum and vanillic acid have been found to be a compatible active substance/filler combination.

Other features and advantages of the present invention will become apparent from the following detailed description, taken in conjunction with the accompanying drawings, which illustrate by way of example, the principles of the invention.

BRIEF DESCRIPTION OF THE DRAWINGS

FIG. 1 schematically illustrates a combustion enhancing substance delivery system according to the present invention interconnected to an internal combustion engine; an FIG. 2 is an enlarged view of the circled area 2 of FIG. 1 showing details of the metering mechanism.

DETAILED DESCRIPTION OF A PREFERRED EMBODIMENT

The figures schematically illustrate an apparatus with which the method of the present invention is practiced. The apparatus enables minute quantities of a combustion enhancing substance, originally in an easily handled solid state, to be introduced into an internal combustion engine's combustion chamber in a highly dispersed state at a precisely controlled rate. The substance's presence during the combustion process increases the engine's power output, decreases the fuel consumption rate and decreases undesirable emissions in the engine's exhaust, including carbon monoxide and incompletely burned as well as unburned hydrocarbons.

FIG. 1 schematically illustrates an internal combustion engine 12 to which the combustion enhancing apparatus 14 of the present invention is interconnected. The illustration shows combustion air 15 drawn in through an air intake duct 16 and fuel line 18 from fuel source 20 feeding the engine. A mixture of the fuel and air is burned in the engine's combustion chamber and results in the rotation of output shaft 21. The resulting gases 23 are expelled from the engine via exhaust duct 22. FIG. 1 further shows the combustion enhancing apparatus 14 to include a hopper 24 for containing a powdered solid 25, a metering mechanism 26 driven by a variable speed motor 28, a conversion chamber 30 and a duct 32 leading to the engine intake system 16. Controller 34 adjusts the speed of variable speed motor 28 in response to any of a number of various sensor inputs 35–38 or alternatively by a manual setting 39.

Hopper 24 is sized in accordance with the rate at which powdered material 25 is consumed so as to provide a supply thereof for a substantial period of time. The hopper's walls 40 are angled sufficiently to ensure a flow of the dry material towards a centrally located exit orifice at the hopper's base.

Metering system 26 is positioned within the hopper's exit orifice. A rotatable ball element 42 sealingly engages inset 44 to prevent the escape of material. Ball 42 has a centrally located bore 46 therein in which piston 48 is free to reciprocate. Piston 48 is sized to provide a close tolerance fit with bore 46 and is of a length selected to be less than the diameter of ball 42. Piston 48 has a laterally positioned, centrally located void 50 formed therein into which eccentrically positioned cam element 54 of rod 52 is received. Ball element 42 is free to rotate about rod 52 which is held in position by bushing 56 at one end and held fixed at the other. Shaft 58 is securely affixed to ball 42 at one end and driven by variable speed motor 28 at its other end. Shaft 58 and rod 52 define the axis 59 about which ball 42 is rotatable. The described mechanism serves to impart a reciprocating motion to piston 48 upon rotation of ball element 42.

Situated directly below metering system 26 is conversion chamber 30 which includes a heatable surface 60 positioned so that any material transferred by metering mechanism 26 from hopper 24 comes into contact with the surface. Heating element 62 maintains the temperature of heatable surface 60 within allowable limits via a controller (not shown). Pressure equalization line 64 sets the conversion chamber 30 in communication with hopper 24 to prevent a build-up of a pressure differential which may otherwise affect the accuracy of the metering system. Vent 66 may optionally be included to vent conversion chamber 30 to the atmosphere. Duct 32 interconnects conversion chamber 30 with the intake duct 16 of engine 12. Gaseous or gas transportable components within chamber 30 are thereby drawn into the engine's combustion chamber.

The speed of variable speed motor 28 is controlled by controller 34 which is responsive either to manual input 39 or any of a variety inputs provided by sensors 35-38 monitoring parameters associated with the engine's performance. For example, sensor 35 measuring intake manifold pressure gives an indirect indication of the amount of fuel being consumed. Additionally, by considering engine rpm (sensor 36) a more accurate indication of engine load is provided to more accurately estimate the fuel consumption rate. Directly measuring fuel flow via sensor 38 provides the most accurate indication of fuel consumption. Controller 34 is programmed to increase the speed of motor 28 as a function of increased fuel consumption regardless of which sensor is relied upon. Alternatively, sensor 37 is employed to measure the emission rate of certain exhaust constituents. Controller 34 is programmed to adjust the motor speed accordingly.

It has been found that bis-acetylacetonato platinum is a compound especially well suited to the process of the present invention and is the substance utilized in the preferred embodiment. The compound is easily handled as a solid, and is readily converted into a highly dispersed gas-transportable state upon heating. The preferred embodiment of the present invention utilizes this particular platinum compound in its finely powdered form. The substance's published sublimation temperature is 338° F. and decomposition occurs at 788° F. However, it has been found that by heating bis-acetylacetonato platinum to between 260° F. and 310° F. an adequate conversion rate into its highly dispersed, gas-transportable state is achieved while temperatures above 310° F. cause the substance to deposit on the heating surfaces and subsequent contact with surfaces at above 400° F. induces the substance to plate out.

In operation, variable speed motor 28 rotates at a speed controlled by controller 34. Drive shaft 58 extending from motor 28 rotates ball 42. With each rotation of ball 42, piston 48 accommodated therein reciprocates within its bore 46 to form a void while at the top of its cycle and to completely fill the void while at the bottom of its cycle. Ball 42 thereby picks up a precisely defined quantity of dry powdered material 25 from within hopper 24 and expels such material downwardly when rotated 180°. Two such cycles result from every rotation of the ball.

Material 25 expelled from ball 42 drops onto heated surface 60 which is maintained at the appropriate temperature by controlled heating element 62. The dry material sublimes or is otherwise directly converted into a highly dispersed, gas-transportable state at which point it is ready to be drawn into or otherwise injected into a combustion process such as exemplified by the illustrated and described internal combustion engine. Normally, simply tapping into such an engine's intake manifold provides an adequate means for delivery, while a supercharged system will require moving such tap to a location subject to sub-atmospheric pressures or alternatively, adequately pressurizing conversion chamber 30.

Controller 34 tailors the material's conversion rate into its highly dispersed, gas-transportable state, preferably, as a function of the engine's fuel consumption rate. Directly measuring fuel flow (sensor 38) provides the most accurate indication of the fuel consumption rate, but the typically encountered, relatively slow flow rates or the complexities introduced by a high pressure recirculating fuel system often make such an approach unviable. Alternatively, the fuel consumption rate is determined by intake air flow and further may be estimated by intake manifold pressure (sensor 35) In normally aspirated, throttled engines, the fuel consumption rate is fairly well approximated by the inverse of the manifold vacuum, i.e. the higher the measured vacuum, the lower the fuel consumption rate. By additionally providing information as to the engines speed (sensor 36) the intake vacuum information can be modified to more accurately determine fuel consumption rate. Controller 34 processes this information regarding fuel consumption rate and based on the required addition rate specific to the particular combustion enhancing substance 25 within hopper 24, determines and sets the appropriate motor speed.

Alternatively, controller 34 is responsive to the emission rates of certain compounds, found in the engine's exhaust (sensor 37). This type of feedback system provides more direct control of the results ultimately desired. By directly measuring hydrocarbon content or carbon monoxide content, the controller appropriately programmed, can more immediately fine tune the conversion rate of the combustion enhancing substance. Measuring the exhaust's $O_2$ content can similarly provide an indication of the efficiency of the combustion process.

EXAMPLE

A combustion enhancement system was constructed according to the present invention in which a conical funnel, having walls sloped at 60° was utilized as the hopper (24). The metering mechanism utilized a 1.00" diameter metering ball accommodating a 0.25" diameter piston element, 0.875" long. This assembly provided a 0.125" deep, 0.25" diameter void of 0.00614 $in^3$ volume for transfer of 0.0122 $in^3$ of material from the hopper to the conversion chamber with every revolution.

The heated surface (60) within the conversion chamber measured approximately 2.5"×6.0" and was maintained at 300° F. with an appropriately interconnected temperature controller and thermocouple.

Vanillic acid was intermixed with bis-acetylacetonato platinum to provide 190:1 dilution by volume. The materials were blended, ground and passed through a 100 mesh screen and subsequently introduced into the hopper.

A 0.25" I.D. delivery hose interconnected with the intake manifold of a 3.8 hp, single cylinder 4-stroke diesel engine deplacing 0.199 liters and driving a 2000 watt generator. A sensor monitored the engine's manifold vacuum and the controller (34) served to adjust the motor's speed to rotate the metering ball element at a maximum of 0.5 rpm at minimum manifold vacuum and with six discrete, evenly spaced slower speeds as maximum vacuum is attained.

The resulting test data showed the hydrocarbon content in the exhaust to decrease by 40-50% with a 1600 watt load placed on the generator. Qualitatively, it was observed that the exhaust turned from black to white. Upon interrupting the conversion of the combustion enhancing substance into its highly dispersed, gas-transportable state, the engine's emission levels quickly returned to their original level and the exhaust smoke once again turned darker.

While a particular form of the invention has been illustrated and described, it will also be apparent to those skilled in the art that various modifications can be made without departing from the spirit and scope of the invention. It is not intended that this invention be limited to a particular type of internal combustion engine or even any specific combustion process. Further, no limitation is intended with respect to any particular combustion enhancing substance. Accordingly, it is not intended that the invention be limited except as by the appended claims.

What is claimed is:

1. A device for enhancing the efficiency of a combustion process in which a hydrocarbon fuel is consumed in a combustion zone in order to diminish the emission therefrom of undesirable compounds including carbon monoxide and incompletely oxidized hydrocarbons, comprising:
   means for storing a preselected combustion enhancing substance in its solid state selected for its stability to significantly enhance said combustion process at ppb-range concentrations and for its convertibility into a highly dispersed, gas-transportable state;
   means for variably converting at a controllable rate said combustion enhancing substance directly from its solid state into its highly dispersed, gas-transportable state; and
   means for transporting said converted substance, substantially immediately upon its conversion, to said combustion zone.

2. The device of claim 1, further comprising means for determining the fuel's consumption rate and means for controlling the conversion rate of the combustion enhancing substance from its solid state to its highly dispersed, gas-transportable state as a function of said determined consumption rate.

3. The device of claim 1, further comprising means for determining the emission rate of selected compounds from the combustion process and means for controlling the conversion rate of the combustion enhancing substance from its solid state to its highly dispersed, gas-transportable state as a function of said determined emission rate.

4. The device of claim 1 wherein said transporting means comprises a gas flow passing through said converted substance in its highly dispersed, gas-transportable state and into said combustion zone.

5. The device of claim 4 wherein said gas flow comprises combustion air for said combustion process.

6. The device of claim 1 wherein said transporting means comprises a gas generated contemporaneously with the conversion of said combustion enhancing substance into its highly dispersed, gas-transportable state that is conducted into the combustion zone.

7. The device of claim 1 wherein said converting means serves to subject said solid combustion enhancing substance to heat.

8. The device of claim 7 wherein said subjecting of said solid combustion enhancing material causes it to sublime.

9. The device of claim 7 wherein said combustion enhancing substance comprises bis-acetylacetonato platinum and said converting means serves to subject said solid substance to a temperature of between about 260° and 310° F.

10. The device of claim 9 further comprising means for preventing said substance in its highly dispersed, gas-transportable state from contacting surfaces exceeding about 330° F. during its transport into the combustion zone.

11. The device of claim 9 wherein said bis-acetylacetonato platinum is stored as a fine powder in a hopper, and the device further comprises a positive displacement pump means for transferring a preselected volume of powder from said hopper onto a heated surface held at between about 260° and 310° F.

12. The device of claim 11 wherein said positive displacement pump is driven by a variable speed motor.

13. The device of claim 12 further comprising means for determining fuel consumption rate and means for varying said motor's speed as a function of said determined consumption rate.

14. The device of claim 12 further comprising means for determining the emission rate of selected constituents from the combustion process and means for varying said motor's speed as a function of said determined emission rate.

15. The device of claim 9 wherein said bis-acetylacetonato platinum powder is diluted with a filler material, said filler material selected to have a particle size and density comparable to the bis-acetylacetonato platinum powder and further selected to sublime at between about 260° and 310° F.

16. The device of claim 15 wherein said subliming filler material is employed to transport said bis-acetylacetonato platinum in its highly dispersed, gas-transportable state into the combustion zone.

17. The device of claim 16 wherein said filler material is vanillic acid.

18. A device for enhancing the efficiency of an internal combustion engine in which hydrocarbon fuel is consumed in a combustion chamber in order to diminish the emission of undesirable exhaust constituents including carbon monoxide and incompletely oxidized hydrocarbons, comprising:
   a container for storing a selected combustion enhancing substance in its solid state, said substance selected for its ability to enhance the combustion process at ppb-range concentrations and further selected for its convertibility into a highly dispersed, gas-transportable state upon heating;
   a heated surface maintainable at a preselected temperatures;
   a positive displacement pump for transferring a preselected quantity of said substance onto said heated surface;
   a variable speed motor for controlling the transfer rate of said pump; and
   a gas stream for transporting said substance converted into its highly dispersed, gas-transportable state into the engine's combustion chamber.

19. The device of claim 18 further comprising means for determining the rate of fuel consumption and means for varying said motor's speed as a function of said consumption rate.

20. The device of claim 19 wherein the engine's intake manifold pressure is measured to approximate the fuel consumption rate.

21. The device of claim 18 wherein finely powdered bis-acetylacetonato platinum is the selected combustion enhancing substance and the heated surface is maintained at between about 260° F. and 310° F.

22. The device of claim 21 wherein the gas stream for transporting converted substance is prevented from contacting surfaces in excess of about 400° F. prior to entering the combustion chamber.

23. A method for enhancing the efficiency of a combustion process in which a hydrocarbon fuel is consumed in a combustion zone in order to diminish emission therefrom of undesirable compounds including carbon monoxide and incompletely oxidized hydrocarbons, comprising the steps of:

selecting a combustion enhancing substance that is in its solid phase at ambient conditions said substance having the ability to significantly enhance said combustion process at ppb-range concentrations and further being convertible into a highly dispersed, gas-transportable state;

storing said substance in its solid state;

variably converting said solid substance at a controllable rate into its highly dispersed, gas-transportable state; and transporting said converted substance, substantially immediately upon its conversion, to said combustion zone.

24. The method of claim 23 further comprising the steps of determining the fuel consumption rate of said combustion process and controlling the rate of converting said solid substance into its highly dispersed, gas-transportable state as a function of the determined fuel consumption rate.

25. The method of claim 23 further comprising the steps of determining the emission rate of selected compounds from said combustion process and controlling the rate of converting said solid substance into its highly dispersed, gas-transportable state as a function of the determined emission rate.

26. The method of claim 23 wherein the converting step comprises the step of heating said solid substance.

27. The method of claim 26 further comprising the step of employing combustion air drawn into said combustion process for transporting combustion enhancing substance in its highly dispersed, gas-transportable state to the combustion zone.

28. The method of claim 23 wherein the converting step comprises subliming said solid substance.

29. The method of claim 28 further comprising the steps of selecting a filler material having a sublimation temperature comparable to the temperature at which said combustion enhancing substance is converted from a solid to its highly dispersed, gas-transportable state and diluting said solid substance with said filler material prior to storage.

30. The method of claim 29 further comprising the step of employing the subliming filler material to transport the combustion enhancing substance in its highly dispersed, gas-transportable state to the combustion zone.

* * * * *